United States Patent [19]
Evans

[11] 4,255,085
[45] Mar. 10, 1981

[54] FLOW AUGMENTERS FOR VERTICAL-AXIS WINDMILLS AND TURBINES

[76] Inventor: Frederick C. Evans, 30 James St., Pittenweem, Fife, Scotland

[21] Appl. No.: 155,619

[22] Filed: Jun. 2, 1980

[51] Int. Cl.³ .............................................. F03D 3/06
[52] U.S. Cl. ............................... 416/197 A; 416/178; 416/236 R
[58] Field of Search ................. 416/17, 109, 111, 119, 416/197 A, 178, 236, 237

[56] References Cited

U.S. PATENT DOCUMENTS

| | | | |
|---|---|---|---|
| 457,384 | 8/1891 | Stoner | 416/197 A |
| 1,011,618 | 12/1911 | Harper | 416/119 X |
| 3,193,185 | 7/1965 | Erwin et al. | 416/236 A X |
| 4,105,363 | 8/1978 | Loth | 416/111 X |
| 4,147,472 | 4/1979 | Kling | 416/189 A |
| 4,178,127 | 12/1979 | Zahorecz | 416/119 X |
| 4,204,805 | 5/1980 | Bolie | 416/197 A X |
| 4,209,281 | 6/1980 | Edmunds | 416/197 A |

FOREIGN PATENT DOCUMENTS

| | | | |
|---|---|---|---|
| 2829716 | 1/1979 | Fed. Rep. of Germany | 416/119 |
| 2745862 | 4/1979 | Fed. Rep. of Germany | 416/197 A |
| 535218 | 4/1922 | France | 416/197 A |
| 537312 | 5/1922 | France | 416/197 A |
| 2257024 | 8/1975 | France | 416/119 |

*Primary Examiner*—Everette A. Powell, Jr.

[57] ABSTRACT

A windmill is disclosed, the windmill including a vertical shaft mounted for rotation about its longitudinal axis, a number of blades spaced circumferentially around the longitudinal axis, and being disposed generally parallel to the axis of rotation of the vertical shaft, and supporting arms extending radially outwardly from the vertical shaft for supporting the blades. The windmill also includes a first member connected to an upper end of one of the blades and defining a first surface having a leading edge with respect to the direction of movement of the blade and a trailing edge rearward of the leading edge, the leading edge being lower than the trailing edge. The first surface also includes an inside lateral edge and an outer lateral edge spaced radially outwardly from the inside lateral edge, the inside lateral edge being higher than the outer lateral edge. A second member is connected to the lower end of the blade and defines a second surface, the second surface having a leading edge with respect to the direction of movement of the blade and a trailing surface rearward of the second surface leading edge, the second surface leading edge being higher than the trailing edge. The second surface also includes an inside lateral edge and an outer lateral edge spaced radially outwardly from the second surface inside lateral edge, the second surface inside lateral edge being lower than the second surface outside lateral edge.

11 Claims, 5 Drawing Figures

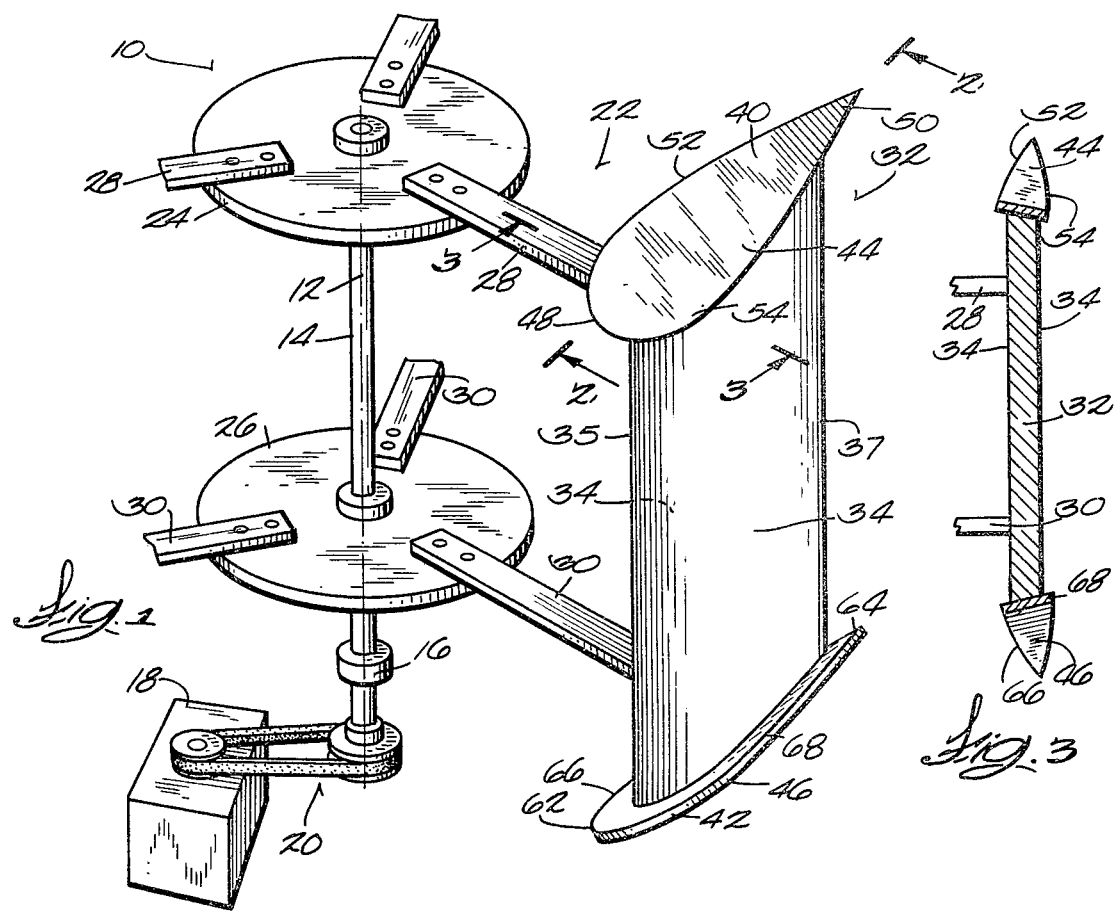
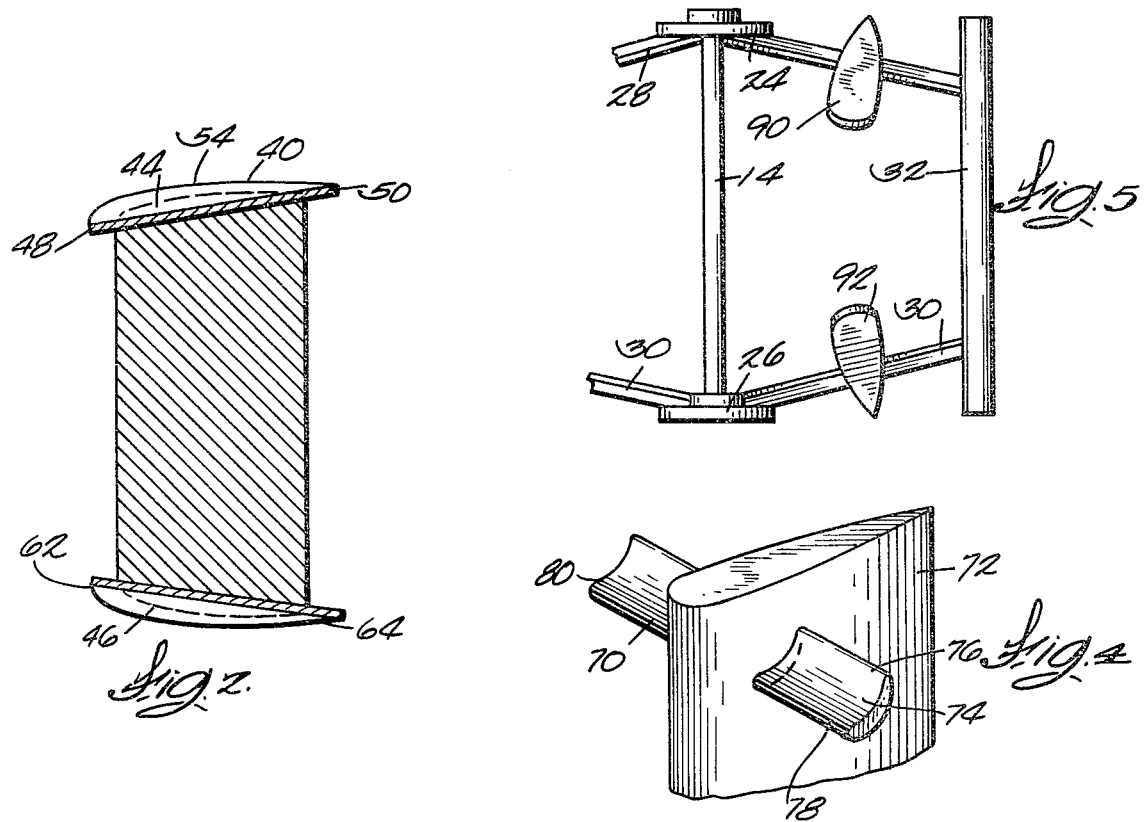

FLOW AUGMENTERS FOR VERTICAL-AXIS WINDMILLS AND TURBINES

FIELD OF THE INVENTION

The invention relates to windmills used for harnessing and converting wind power into useful energy. More particularly, the invention relates to a windmill construction for increasing the rate of flow of air through vertical axis windmills, or increasing the rate of flow of fluids through turbines in such a way as to increase their power output and efficiency.

BACKGROUND PRIOR ART

One mode of windmill construction comprises a blade assembly which rotates about a generally vertical axis. Examples of such vertical axis windmills are shown in the U.S. Pat. No. 622,115 Carlson; the U.S. Pat. No. 2,038,467 Zanoski; the U.S. Pat. No. 4,115,027 Thomas; and the U.S. Pat. No. 4,032,257 de Haas. Attention is also directed to the German Pat. No. 342,778, Muhlbach issued Oct. 24, 1921; the German Pat. No. 2,602,380 Sicard, issued July 29, 1976; the British Pat. No. 13,700 Robertson issued June 9, 1903; the French Pat. No. 530,231 Rondeau, issued Dec. 21, 1921; and the French Pat. No. 2,291,381 Fassle, issued June 11, 1976.

SUMMARY OF THE INVENTION

The present invention includes a windmill comprising a vertical shaft mounted for rotation about its longitudinal axis, a number of blades spaced circumferentially around the longitudinal axis, and being disposed generally parallel to the axis of rotation and supporting arms extending radially outwardly from the vertical shaft for supporting the blades. The windmill also includes means for increasing the rate of mass flow through the windmill including a member connected to at least one of the blades, the member defining a surface having a leading edge with respect to the direction of movement of the blade and a trailing edge rearward of the leading edge, and the leading edge being lower with respect to vertical axis than said trailing edge. The surface also includes an inside lateral edge and an outer lateral edge spaced radially outwardly from the inside lateral edge, the inside lateral edge being higher with respect to the vertical axis than the other lateral edge.

The invention also includes a windmill comprising a vertical shaft mounted for rotation about its longitudinal axis, a number of blades spaced circumferentially around the longitudinal axis and being disposed generally parallel to the axis of rotation of the vertical shaft, and supporting arms extending radially outwardly from the vertical shaft for supporting the blades. The windmill also includes means for increasing the rate of mass flow through the windmill including a first member connected to an upper end of one of the blades and defining a first surface having a leading edge with respect to the direction of movement of the blade and a trailing edge rearward of the leading edge, the leading edge being lower than the trailing edge. The first surface also includes an inside lateral edge and an outer lateral edge spaced radially outwardly from the inside lateral edge, the inside lateral edge being higher than the outer lateral edge. The means for increasing the rate of mass flow through the windmill also includes a second member connected to the lower end of the blade defining a second surface, the second surface having a leading edge with respect to the direction of movement of the blade and a trailing surface rearward of the second surface leading edge, the second surface leading edge being higher than the trailing edge. The second surface also includes an inside lateral edge and an outer lateral edge spaced radially outwardly from the second surface inside lateral edge, the second surface inside lateral edge being lower than the second surface outer lateral edge.

Various other features of the invention are set forth in the following description, in the claims and in the drawings.

BRIEF DESCRIPTION OF THE DRAWINGS

FIG. 1 is a fragmentary, perspective and partially diagrammatic view of a windmill device which embodies features of the invention.

FIG. 2 is a cross section view taken generally along line 2—2 in FIG. 1.

FIG. 3 is a cross section view taken generally along line 3—3 in FIG. 1.

FIG. 4 is a partial perspective view of an alternative embodiment of a device embodying the invention.

FIG. 5 is a partial perspective view similar to FIG. 3 and showing a second alternative embodiment of the invention in detail.

Before describing the preferred embodiments of the invention, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENTS

A windmill device is shown in FIG. 1 and, in response to the prevailing wind, is operable to rotate about a generally vertical primary axis of rotation 12, and in the illustration in FIG. 1, is adapted to rotate in a clockwise direction.

More particularly, a vertical main shaft 14 is journaled in suitable conventional bearings, for example 16, for axial rotation on the primary axis 12. The primary axis is defined by the longitudinal axis of the vertical main shaft 14. The device 10 can be used to convert wind energy to power by driving a load 18. The transmission of force to the load can be in any conventional manner, for example the illustrated belt and pulley assembly 20.

A blade assembly 22 is operative to catch the wind and to cause the shaft 14 to rotate about the primary axis 12. More particularly, the upper and lower discs 24 and 26 are attached by suitable means to the main shaft 14 for common rotation therewith. Three separate support arm assemblies each comprising upper and lower arms 28 and 30 extend radially outwardly relative to the primary axis 12, the arms 28 and 30 being bolted or otherwise securely fastened to the discs 24 and 26, respectively. It should be appreciated that the number of support arm assemblies can vary; however, for most efficient operation, the support arm assemblies should be equally spaced about the primary axis 12. In the illustrated embodiment, the three support assemblies are each equally separated by approximately 120°.

A blade 32 is supported between each pair of arms 28 and 30 at a distance outwardly spaced from the primary axis 12 and is fixedly supported by the arms for rotation with the arms about the axis 12. FIG. 1 shows only one blade 32; however, it should be appreciated that each support arm assembly carries a blade 32 constructed and operable as hereafter described.

As illustrated, the blade 32 is generally rectangularly shaped in vertical cross section and has upstanding sidewalls 34. The sidewalls 34 may have a flat outer contour; however, in the illustrated preferred embodiment, the sidewalls 34 are bowed between a leading edge 35, tapering to a trailing edge 37. In cross section, blade 32 takes the form of an aerofoil. The aerofoil section is more desirable than a flat section because of its ability to produce a large aerodynamic reaction, or lift, while at the same time producing relatively small resistance, or drag, parallel to its direction of motion.

Means are further provided for increasing the rate of mass flow through the windmill. Such means comprises a pair of aerodynamic surfaces or augmenters 40 and 42 connected to the blade 32 for rotation about the vertical axis 12. In the particular construction shown in FIG. 1, the augmenters 40 and 42 comprise a pair of thin planar blade members or vanes having reaction surfaces 44 and 46, respectively. In the construction illustrated in FIGS. 1-3, the augmenters 40 and 42 are supported by upper and lower ends of the blades 32. The augmenter 40 carried by the upper end of the blade 32 is shown as including a planar reaction surface 44. The reaction surface 44 includes a leading edge 48 and a trailing edge 50 as well as a radial inner edge 52 and a radially outer edge 54. As shown in FIG. 2 the augmenter 40 is inclined downwardly and forwardly with respect to the direction of rotation of the blade 32 such that the leading edge 48 of the augmenter 40 is lower than the trailing edge 50. The augmenter 40 is also sloped downwardly and outwardly such that the outer edge 54 is lower than the radially inner edge 52. The augmenter 42 carried by the lower end of the blade 32 is shown as also including a planar reaction surface 60, that surface including a leading edge 62 and a trailing edge 64 as well as a radially inner edge 66 and a radially outer edge 68. As shown in FIG. 2 the lower augmenter 42 is inclined upwardly and forwardly with respect to the direction of rotation of the blades 32 such that the leading edge 62 of the lower augmenter 42 is higher than the trailing edge 64. As shown in FIG. 3, the augmenter 42 is also sloped upwardly and outwardly such that the outer radial edge 68 of the surface is above the lower radially inner edge 66.

Describing the relative orientation of the upper and lower augmenters in an alternative manner, it will be noted that with respect to a vertical plane which is tangent to the cylindrical surface traced out by the blades 32 during their rotation around the vertical axis, such as a plane taken along line 2—2 in FIG. 1, the upper and lower augmenters 40 and 42 will be inclined with their leading edges 48 and 62, respectively, towards one another and their trailing edges 50 and 64, respectively, spaced apart, i.e., the upper augmenter 40 being inclined downwardly and the lower one 42 being inclined upwardly. When viewing the augmenters in a radial plane as taken along line 3—3 in FIG. 1, which plane comprises a vertical plane containing the axis of rotation and bisecting one of the blades 32, the augmenters 40 and 42 supported by that blade are shown as being inclined such that their radially outer edges 54 and 68, respectively, are closer together than their radially inner edges 52 and 66, respectively, i.e., the upper augmenter 40 slopes downwardly away from the axis of rotation 12 and the lower augmenters 42 slopes upwardly away from the axis of rotation.

In the particular construction of the invention shown in the drawings, it has been found that the efficiency of the windmill can be increased if the slope between the trailing edge and the leading edge of the augmenter 40 when viewed as in FIG. 2, is approximately 10° with respect to the direction of movement of the blade. The lower augmenter should also be disposed at an angle of approximately 10° with respect to the direction of movement of the blade. If the augmenters are disposed at a lesser angle, the effectiveness of the augmenters will be reduced. If they are disposed at an angle which is substantially greater than 10°, they will cause excessive drag, resulting in aerodynamic stall.

Referring now to the preferred orientation of the augmenters when viewed in FIG. 3, it has been found by empirical study that a suitable angle is in the approximate range of from 30°-45° with respect to a horizontal plane, i.e., a line extending through the outside lateral edge of the augmenter and the inside lateral edge should be at an angle of approximately 30°-45° with respect to a horizontal plane.

The primary advantage of the use of the augmenters 40 and 42 is to increase the power output from a machine of given size, i.e., increase the efficiency of a wind driven machine, by virtue of the increased rate of mass flow of the fluid which can be achieved by use of the augmenters 40 and 42. A second advantage is that the augmenters 40 and 42 have the property of controlling the tip vortices formed at the ends of the blades 32, in order to modify the characteristics of the windmill as may be desired. A third advantage in the augmenters is the tendency of the augmenters to diminish the bending moments in the blades 32, thus improving the resistance of the windmill to accidental breakage.

While the augmenters 40 and 42 have been described as being employed with the blades of a vertical axis windmill, it will be recognized by those skilled in the art that the augmenters could also be adapted for use on turbine blades to improve the efficiency of a turbine.

In the particular construction illustrated, the blades 32 of the windmill are shown as being fixed to the support arms 28 and 30. The augmenters 40 and 42 can also be employed in other types of vertical axis windmills, such as wherein the blades are pivotally connected to the radially outer ends of the support arms so as to be supported for limited pivotable movement about a vertical axis extending through the outer ends of the support arms.

FIG. 4 illustrates another alternative embodiment of the invention shown in FIGS. 1-3. In the embodiment shown in FIG. 4 an augmenter 70 extends laterally outwardly from the opposed surfaces of an upper end of a blade 72 and has a shape resembling a wing of high aspect ratio. As in the case of the augmenter 40, the surface 74 of the augmenter 70 is inclined downwardly and forwardly from the trailing edge 76 to the forward edge 78 and the augmenter 70 is positioned with respect to the blade 72 such that the radially inner end 80 of the augmenter 70 is higher than the radially outer end 82 thereof. A second augmenter of similar shape (not shown) would extend from the lateral sides of the lower end of the blade 72. That augmenter would be oriented so that its leading edge would be elevated with respect to the trailing edge and the radially outer end of the augmenter would be higher than the radially inner end.

Another alternative embodiment is illustrated in FIG. 5 wherein augmenters 90 and 92 are shown as being an integral part of the support arms 28 and 30 rather than being fixed to the upper and lower ends of blades 32.

Various features of the invention are set forth in the following claims.

I claim:

1. A windmill comprising a vertical shaft mounted for rotation about its longitudinal axis, a number of blades spaced circumferentially around said longitudinal axis, each of said blades being disposed generally parallel to the axis of rotation of the vertical shaft, supporting arms extending radially outwardly from the vertical shaft for supporting said blades, and means for increasing the rate of mass flow through the windmill including a member connected to at least one of said blades, said member defining a surface, said surface having a leading edge with respect to the direction of movement of the blade and a trailing edge rearward of said leading edge, said leading edge being lower with respect to said vertical axis than said trailing edge, an inside lateral edge and an outer lateral edge spaced radially outwardly from said inside lateral edge, said inside lateral edge being higher with respect to said vertical axis than said outside lateral edge.

2. A windmill as set forth in claim 1 and wherein said surface is planar.

3. A windmill as set forth in claim 1 and wherein said member is supported by one of said supporting arms.

4. A windmill as set forth in claim 1 wherein said blades are of aerofoil cross section.

5. A windmill comprising a vertical shaft mounted for rotation about its longitudinal axis, a number of blades spaced circumferentially around said longitudinal axis, each of said blades being disposed generally parallel to the axis of rotation of the vertical shaft, said blades each including an upper end and a lower end supporting arms extending radially outwardly from the vertical shaft for supporting said blades, and means for increasing the rate of mass flow through the windmill including a first member connected to an upper end of one of said blades, said first member defining a first surface having a leading edge with respect to the direction of movement of the blade and a trailing edge rearward of said leading edge, said leading edge being lower than said trailing edge, an inside lateral edge and an outer lateral edge spaced radially outwardly from said inside lateral edge, said inside lateral edge being higher than said outside lateral edge, and a second member connected to said lower end of said one of said blades, said second member including a second surface, said second surface having a leading edge with respect to the direction of movement of said one of said blades and a trailing surface rearward of said second surface leading edge, said second surface leading edge being higher than said trailing edge, an inside lateral edge and an outer lateral edge spaced radially outwardly from said second surface inside lateral edge, said second surface inside lateral edge being lower than said second surface outside lateral edge.

6. A windmill as set forth in claim 5 wherein said surfaces are planar.

7. A windmill as set forth in claim 5 wherein one of said supporting arms extends radially outwardly from the vertical shaft and supports said upper end of said one of said blades and wherein a second supporting arm extends radially outwardly from the vertical shaft and supports said lower end of said one of said blades, and wherein said first member is supported by said one of said arms and wherein said second member is supported by said other of said supporting arms.

8. An air driven machine comprising a vertical shaft having a longitudinal axis, a number of blades spaced circumferentially around said axis, said blades each being disposed generally parallel to the axis of rotation of the vertical shaft, means for connecting said blades and for supporting said blades for rotation about said axis, and means for increasing the rate of mass flow through the windmill including a member connected to at least one of said blades, said member defining a surface, said surface having a leading edge with respect to the direction of movement of the blade and a trailing edge rearward of said leading edge, said leading edge being lower than said trailing edge, an inside lateral edge and an outer lateral edge spaced radially outwardly from said inside lateral edge, said inside lateral edge being higher than said outside lateral edge.

9. An air driven machine as set forth in claim 8 and wherein said surface is planar.

10. An air driven machine as set forth in claim 8 wherein said blades each include an upper end and a lower end, and wherein said member is fixedly connected to said upper end of one of said blades and wherein said means for increasing the rate of mass flow further includes a second member connected to said lower end of said one of said blades, said second member including a second surface, said surface having a leading edge with respect to the direction of movement of said one of said blades and a trailing surface rearward of said leading edge, said leading edge being higher than said trailing edge, an inside lateral edge and an outer lateral edge spaced radially outwardly from said inside lateral edge, said inside lateral edge being lower than said outside lateral edge.

11. A windmill comprising a shaft having a longitudinal axis, a number of blades spaced apart circumferentially around said longitudinal axis, said blades each being disposed generally parallel to said axis of rotation and having opposite ends, means for connecting said blades and for supporting said blades for rotation about said axis, and means for increasing the rate of mass flow through the windmill including a first member connected to one of said end of one of said blades, said first member defining a first surface, said first surface having a leading edge with respect to the direction of movement of the blade and a trailing edge rearward of said leading edge, an inside lateral edge adjacent said axis and an outer lateral edge spaced radially outwardly from said inside lateral edge, and a second member connected to the other end of said one of said blades, said second member including a second surface, said surface having a leading edge with respect to the direction of movement of said one of said blades and a trailing surface rearward of said leading edge, an inside lateral edge adjacent said vertical axis and an outer lateral edge spaced radially outwardly from said inside lateral edge, said outside lateral edges of said first and second surfaces being closer together than said inside lateral edges of said first and second surfaces and said leading edges of said first and second surfaces being closer together than said trailing edges of said first and second surfaces.

* * * * *